United States Patent Office 3,236,883
Patented Feb. 22, 1966

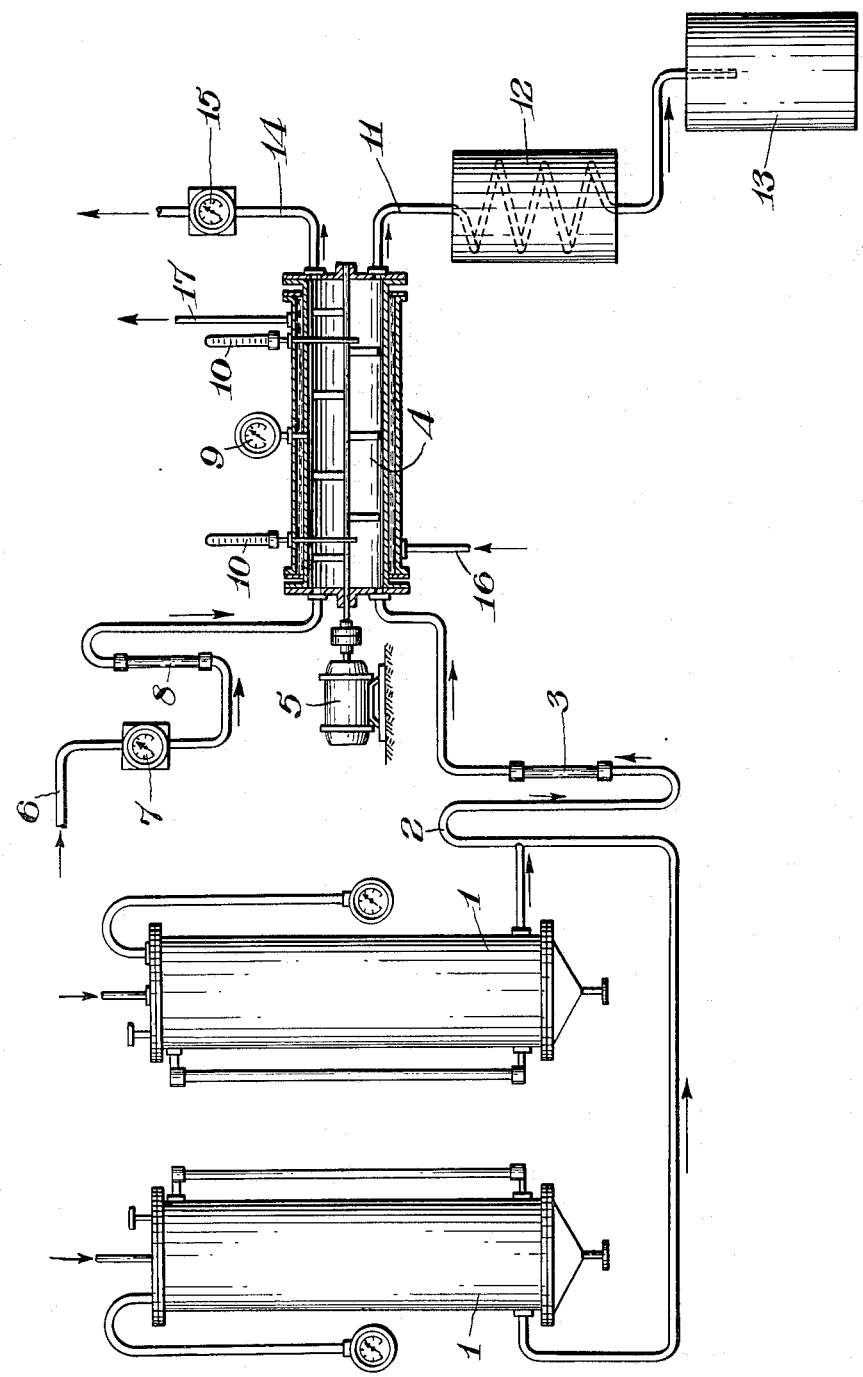

3,236,883
PROCESS FOR THE MANUFACTURE OF PERACIDS
Josef Lösch, deceased, late of Cologne, Germany, by Hedwig Franz geboren Lösch, mesne heiress, Cologne, Germany, assignor to Knapsack-Griesheim Aktiengesellschaft, Knapsack, near Cologne, Germany, a corporation of Germany
Continuation of application Ser. No. 818,840, June 8, 1959. This application Oct. 14, 1963, Ser. No. 316,191
Claims priority, application Germany, June 13, 1958, K 35,062
6 Claims. (Cl. 260—502)

The present invention is concerned with a process for the manufacture of peracids from aldehydes and also with an apparatus for carrying out said process. This invention being a continuation application of our copending application Ser. No. 818,840, filed on June 8, 1959 for "Process and Device for the Manufacture of Peracids" (now abandoned).

When oxidizing aldehydes with molecular oxygen to obtain the corresponding acids it was originally assumed that the primary oxidation product must be the peracid. Since, however, it had hitherto not been possible to detect and to obtain the free peracid in said reaction, complicated chain reactions had been supposed involving the formation of free radicals.

It has been known for some time that per-compounds are formed by treating aldehydes with oxygen or oxygen-containing gases at temperatures of 0° C. or below which can be regarded as addition compounds of aldehydes on peracid and which can be isolated. When acetaldehyde is used there is obtained, under these conditions, a compound of 1 mol of acetaldehyde with 1 mol of peracetic acid, the hydroxyethylacetyl peroxide named in literature the aldehyde-peracetate.

These per-compounds are extremely unstable and are transformed at temperature above 0° C. and under the action of catalysts of heavy metal salts into the corresponding carboxylic acids or carboxylic anhydrides with a strong and often explosive evolution of heat.

It is known to produce and isolate peracids by decomposing, after the separation of the unreacted aldehyde, the unstable per-compounds obtained in the oxidation of the aldehyde by a catalytic treatment, for example with sulphuric acid or by evaporating at a high temperature, in such a manner that free peracid is formed, in addition to aldehyde. The peracid is then separated by fractionating distillation. Since peracid and aldehyde react with one another very vigorously, the separation must be realized with special precautions under reduced pressure and with the addition of inert auxiliary liquids.

The oxidation of the aldehydes to obtain the aforesaid per-compounds takes place at the above mentioned low temperature in a slow and incomplete manner. It is not possible to add the heavy metal salt catalysts generally used in the conventional oxidation in an amount ranging from 0.1 to 1% since such an amount has a disturbing action on the aldehyde per-compound and the peracid to be isolated, whereas an amount of about 0.0001% will not have a sufficient action according to the relevant literature.

In order to increase the oxidation velocity it has, therefore, been proposed to add ozone to the oxygen or to perform the oxidation under the action of ultraviolet light. However, in this case, too, only part of the aldehyde used is reacted to obtain per-compounds. In most cases, more than 50% of the aldehyde does not participate in the reaction and must then be eliminated in a rather complicated manner and with considerable losses.

In accordance with the present invention, the oxidation of the aldehyde which is soluted in an inert diluent is carried out in the presence of a heavy metal salt selected from the group consisting of iron acetate and iron acetonyl acetate at a temperature in the range of from about 20° to 50° C. and a pressure in the range of from about 2.5 to about 5 atmospheres gauge with the concentration of the iron acetate being below at least 0.0001% by weight and the concentration of the iron acetonyl acetate being below 0.001% by weight based on the aldehyde.

The present invention is based on the observation that the oxidation of the aldehydes can be realized so that not only the aldehyde participates quantitatively in the reaction but that, moreover, the main part of the aldehyde can be directly oxidized so as to yield free peracid which satisfies all requirements.

The process of the present invention fulfils a long standing desire for the direct production of peracid from aldehyde and, moreover, elucidates the reaction mechanism of the action of oxygen on aldehyde to the effect that the peracid is primarily formed from 1 mol of aldehyde and 1 mol of oxygen according to the following equation given for acetaldehyde:

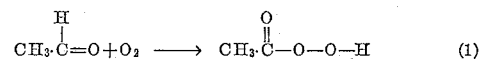
(1)

If there is still sufficient aldehyde remaining to react with the peracetic acid formed, the following secondary reactions take place, depending on the reaction conditions:

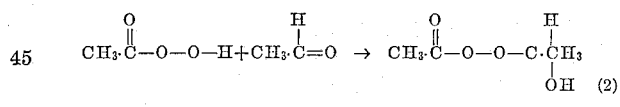
aldehyde peracetate

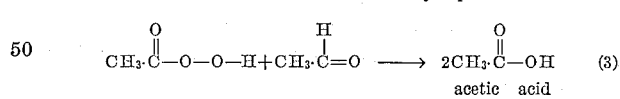
acetic acid

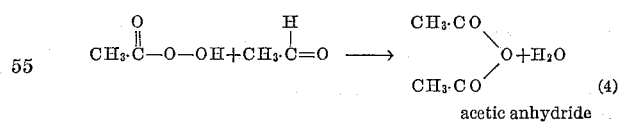
acetic anhydride

The steps which lead surprisingly to the formation of the free peracid are based, in the end, on the fact that the aldehyde is rendered so oxygen-active that the absorption of oxygen according to reaction (1) takes place in so rapid a manner that the secondary reactions (2), (3) and (4) cannot take place due to the lack of free aldehyde. It is necessary that the oxygen be mixed intimately with the aldehyde in an amount necessary for the formation of peracid.

The activation of the aldehyde with respect to oxygen is due, in the first place, to the addition of certain heavy metal salt catalysts in the oxidation. Of the salts of the heavy metals, iron, cobalt, copper, nickel, chromium and vanadium that are suitable for the activation of aldehydes, the salts of iron have proved to be particularly suitable since, as ascertained by tests, they do not have an undesirable effect on the peracid obtained. It is proposed to use iron acetate or another iron salt which is soluble in the aldehyde mixture, such as iron acetonyl acetate.

If the peracid produced is to be used at once, it is also possible to use the other heavy metal salts.

The second feature of the invention consists in the increase of the oxidation temperature. Since the known processes for the production of aldehyde per-compounds are carried out at temperatures of about 0° C. and below in order to obtain such oxygen-active compounds, it was particularly surprising that the best yields of peracid can be obtained at temperatures in the range of +30° C. to +40° C. without the supposed formation of larger amounts of carboxylic acid. This is due to the fact that the peracid is formed at a higher temperature much more rapidly than the carboxylic acid or carboxylic anhydride from the peracid and the aldehyde.

In order to eliminate the undesired secondary reactions to a satisfactory extent, it is necessary, as already mentioned, to mix the oxygen intimately with the aldehyde and to add an amount of oxygen such that at least 1 mol of oxygen is present per mol of aldehyde. It is, therefore, of advantage to introduce the oxygen into the aldehyde in a high concentration, that is to say under the corresponding pressure, and intimately to mix both components. When air is used instead of oxygen, the pressure must be increased accordingly.

It is found that the requirement of the sufficient addition of oxygen can be best complied with by carrying out the process continuously while the dosage is regulated in such a manner that the necessary amount of oxygen is introduced into the apparatus together with the aldehyde (1–2 mols of oxygen per 1 mol of aldehyde). The continuous process is preferred to the discontinuous since, in the latter case, it is difficult, particularly when larger amounts are to be reacted, to add at once to the aldehyde the required amount of oxygen without a detrimental excess of aldehyde being present for a prolonged time.

A further step for reducing the secondary reactions is the dilution of the aldehyde with inert solvents, such as acetone or ethyl acetate, in the oxidation step since the said secondary reactions depend on the concentration of the aldehyde or the peracid in the oxidation mixture. The more rapidly the aldehyde can be provided with the required amount of oxygen, the higher the concentrations of aldehyde that can be used.

Thus, it is possible, for example, to obtain within a few minutes a reaction product having a titrimetric peracid content of 18% from a mixture of 15 parts of acetaldehyde, 85 parts of acetone and 0.0001 part of ferric acetate by a treatment with the required amount of oxygen under a pressure of 4 atmospheres gauge and at +35° C., while mixing thoroughly, about 65% of the aldehyde being transformed into free peracetic acid. About 15–20% of the aldehyde is transformed into aldehyde peracetate and the rest into acetic acid.

When the proportion of aldehyde is reduced in the starting mixture, the proportion of free peracid is further increased, whereas with a higher content of aldehyde the amount of free peracid decreases at the expense of the secondary products. In a continuous process, the yield proportions are still more favourable.

The aforesaid peracid solutions obtained in one way or the other can be used for most purposes without further treatment. When a higher concentration of the peracid is desired, part of the solvent added at the oxidation step is distilled off, advantageously under reduced pressure. Since no disturbing constituents are present in the oxidation mixture, the concentration of the peracid involves no considerable losses of yield.

The process according to the present invention for the direct manufacture of peracid from aldehydes is applicable to all known aliphatic aldehydes, such as acetaldehyde, propionic aldehyde and butyraldehyde, and also to aromatic aldehydes, such as benzaldehyde. The unsaturated aldehydes also react in the same manner but the peracids obtained, such as crotonic peracid are very unstable due to the olefinic bond and decompose, particularly at higher temperatures, even in dilute solutions and often explosively.

The accompanying drawing diagrammatically represents a flow scheme of a device for carrying out the process according to the present invention.

The reservoirs 1 are charged with the mixture of aldehyde, solvent and catalyst which is forced into the oxidation vessel 4 by means of compressed nitrogen by way of feed pipe 2 and liquid meter 3. The oxidation vessel 4 consists of an elongated, horizontal pressure vessel lined with aluminium and surrounded by a cooling jacket into which cooling water is fed, through inlet 16 and removed through outlet 17. The oxidation vessel 4 is provided inside with a high speed stirrer operated by the motor 5. The oxygen is forced into the oxidation vessel 4 through inlet 6 via gas meter 7 and rotameter 8 and the necessary pressure is read off on a manometer 9. The commencement of the oxidation can be detected by the increase in temperature on the thermometers 10. When the temperature required for the oxidation is reached, it is maintained by regulation of the cooling water. The oxidized mixture travels into the receiver 13 by way of outlet 11 and cooler 12. The waste gas formed is expelled through outlet 14 by way of gas meter 15. The apparatus is suitable for discontinuous as well as continuous operation.

The process according to the present invention for oxidizing aldehydes to peracids by means of gaseous oxygen or oxygen-containing gases, therefore, comprises the following features:

(a) the aldehyde is mixed in the oxidation with traces of heavy metal salts, preferably iron salts, in an amount of at most 0.001% preferably of at most 0.0001%, calculated on the amount of aldehyde used;

(b) the oxidation is carried out at a temperature within the range of +20° C. to +50° C., preferably between +30° C. and +40° C.;

(c) 1–2 mols of oxygen are used per mol of aldehyde;

(d) inert diluents with respect to peracid, such as ketones, esters, hydrocarbons and chlorinated hydrocarbons, are added to the aldehyde prior to the oxidation;

(e) the process may be carried out under elevated pressure;

(f) the reaction is carried out continuously.

The above measures may be applied either individually or in combination.

In a further variant of the device for carrying out the process according to the present invention, the oxidation pressure vessel, surrounded by a cooling jacket operated with a cooling liquid, is connected with reservoirs for a mixture of aldehyde, solvent and catalyst and with an inlet for the oxygen. The oxidation autoclave is also provided with a manometer and means for measuring the temperature and a cooler and a receiver for the oxidized mixture, as well as an outlet for the waste gas, are provided.

The following examples are given for the purpose of illustrating the present invention:

*Example 1*

An autoclave of at least 5 litres capacity and provided with a cooling jacket is charged with a mixture containing 10% by weight of aldehyde (200 grams acetaldehyde and 1800 grams ethyl acetate) in which is dissolved 0.002 gram iron acetonyl acetate. While vigorously stirring or shaking, oxygen is introduced at a pressure of 4 atmospheres gauge in an amount of 1 mol oxygen per mol aldehyde until the absorption is terminated, this being the case after a few minutes. The cooling is adjusted so that a temperature of 30–35° C. is maintained during the oxidation. The precipitated oxydation product has a weight of about 2130 grams and has a total peracid content of 12.8%. The content of free peracetic acid amounts to 11.5% according to analysis, corresponding to a conversion of 71% of the aldehyde used.

*Example 2*

An autoclave as described in Example 1 is charged with a mixture containing 15% of aldehyde (200 grams acetaldehyde and 1130 grams acetone) and the reaction is carried out as described in Example 1. About 1450 grams of oxidation product are obtained having a total acid content of 18.0% corresponding to a yield of 64% calculated on the aldehyde used. The yield of free peracetic acid amounts to 15%.

*Example 3*

The experiment is carried out as described in Example 1, but the mixture used contains 25% of aldehyde (200 grams acetaldehyde and 600 grams butylacetate). The oxidation is carried out at a pressure of 2.5 atmospheres gauge. 920 grams of an oxidation product are obtained having a total content of peracid of 28% corresponding to a yield of 45% calculated on the aldehyde used. The yield of free peracetic acid amounts to 17%.

*Example 4*

The experiment is carried out as described in Example 1. The mixture used is composed of 200 grams butyraldehyde and 1800 grams acetone and the oxidation takes place at a temperature of 40–45° C. 2080 grams of an oxidation product are obtained having a total content of peracid of 11.5% corresponding to yield of 75%, calculated on the aldehyde used. 10.5% are free perbutyric acid.

*Example 5*

A mixture of 200 parts of weight acetaldehyde, 600 parts by weight ethyl acetate and 0.0001 part by weight iron acetate is pumped continuously through a well-cooled, continuously operating, pressure apparatus provided with intense stirrers for thoroughly mixing the liquid and the gas. At the mixture inlet, is added oxygen at a pressure of 5 atmospheres gauge in an amount such that 1.5 mols oxygen are present per 1 mol acetaldehyde. The reaction chamber is so dimensioned that the mixture intimately mixed with oxygen remains therein for only a short period. The cooling is so regulated that a reaction temperature of 35–40° C. can be maintained. The oxidation product leaving the apparatus has a total content of peracid of 26% corresponding to a yield of 61%, calculated on the aldehyde used. The proportion of free peracetic acid amounts to 23%.

*Example 6*

The experiment is carried out in an apparatus as described in Examples 1–4. A mixture of 75 grams benzaldehyde, 425 grams methylene chloride and 0.0001 gram cobalt acetate is oxidized with an amount of oxygen such that 2 mols oxygen are present per 1 mol aldehyde. The oxidation temperature is +20–25° C. and the oxygen pressure 3 atmospheres gauge. 520 grams of oxidation product are obtained having a content of benzoic peracid of 14.2% corresponding to a yield of 78.6%, calculated on the aldehyde used. The rest is benzoic acid.

*Example 7*

An autoclave having a capacity of 10 litres, surrounded by a cooling jacket and provided with cooling coils, is charged with a mixture of 500 grams acetaldehyde and 4500 grams ethyl acetate containing 0.0005 gram dissolved iron acetonyl acetate. While vigorously stirring or shaking, oxygen is introduced at a pressure of 4 atmospheres gauge in an amount of at least 1 mol oxygen per 1 mol aldehyde and so rapidly that the absorption is terminated within 15–20 minutes. The cooling is so regulated that a temperature of 30–35° C. is maintained during the oxidation. The oxidation product obtained has a total content of per-compounds of 12.2%, calculated as peracetic acid. The proportion of free peracetic acid amounts to 10.3%, i.e. 85% of the total peracetic acid. 15% are present in the form of acetaldehyde peracetate. The yield of peracid amounts to 63%, calculated on the aldehyde used.

*Example 8*

The experiment is carried out as described in Example 7 with the exception that the mixture used is composed of 200 grams acetaldehyde, 1130 grams acetone and 0.0002 gram ferric acetate. The oxidation is terminated after a few minutes. The oxidation product contains a total of 17.5% of per-compounds. The proportion of free peracid is 14.5%, corresponding to 83% of the total peracid. The yield of peracid amounts to 61%, calculated on the aldehyde used.

*Example 9*

The experiment is carried out as described in Example 7. The mixture used is composed of 200 grams acetaldehyde, 600 grams butyl acetate and 0.0001 gram iron acetonyl acetate. The oxidation is carried out with oxygen at a pressure of 2.5 atmospheres gauge. The oxidation product obtained contains a total amount of 26% of per-compounds. The proportion of free peracid is 19%, corresponding to 73% of the total peracid. The rest is present in the form of acetaldehyde peracetate. The yield of peracid amounts to 42%, calculated on the aldehyde used.

*Example 10*

The experiment is carried out as described in Example 7. The mixture used is composed of 200 grams butyraldehyde, 1800 grams acetone and 0.0002 gram iron acetonyl acetate. The oxidation product contains a total amount of 10.8% of per-compounds, 9.2% being present as free peracid corresponding to 68% calculated on the aldehyde used.

*Example 11*

The experiment is carried out as described in Examples 7–10. However, a mixture of 150 grams benzaldehyde, 850 grams methylene chloride and 0.0001 gram cobalt acetate is oxidized with oxygen within 15 minutes so that 2 mols oxygen are present per 1 mol aldehyde. The oxidation temperature is 20–25° C. and the oxygen pressure 3–3.5 atmospheres gauge. The oxidation product contains 14.0% benzoic peracid corresponding to a yield of 78%, calculated on the aldehyde used. The rest is benzoic acid.

What is claimed is:
1. In the process for the manufacture of peracids by oxidation of a substance selected from the group consisting of aliphatic and aromatic aldehydes with a substance selected from the group consisting of gaseous oxygen and oxygen-containing gases in the presence of heavy metal salts as catalyst, the improvement which comprises carrying out the oxidation of the aldehyde which is soluted in an inert diluent in the presence of a heavy metal salt selected from the group consisting of iron acetate and iron acetonyl acetate at a temperature in the range from about 20° to 50° C. and a pressure in the range from about 2.5 to about 5 atmospheres gauge, and wherein the concentration of iron acetate is below

0.0001% by weight and the concentration of iron acetonyl acetate is below 0.001% by weight based on said aldehyde.

2. The process of claim 1 wherein a substance selected from the group consisting of ethyl acetate, butyl acetate, acetone and methylene chloride is used as an inert diluent.

3. The process of claim 1, wherein the oxidation is carried out at a temperature in the range from about 30° to 40° C.

4. The process of claim 1, wherein about 1 to 2 mols of oxygen are used per mol aldehyde.

5. The process of claim 1 wherein said heavy metal salt is iron acetate.

6. The process of claim 1 wherein said heavy metal salt is iron acetonyl acetate.

References Cited by the Examiner

UNITED STATES PATENTS

| 1,179,421 | 4/1916 | Galitzenstein et al. | 260—502 |
| 2,804,473 | 8/1957 | Phillips et al. | 260—502 |
| 2,830,080 | 4/1958 | Stevens | 260—502 |

FOREIGN PATENTS

| 272,738 | 4/1914 | Germany. |

LORRAINE A. WEINBERGER, *Primary Examiner.*

LEON ZITVER, *Examiner.*